INVENTORS
Frank R. Hinds
Henry O. Pommer
BY Evans & Leame
ATTORNEYS

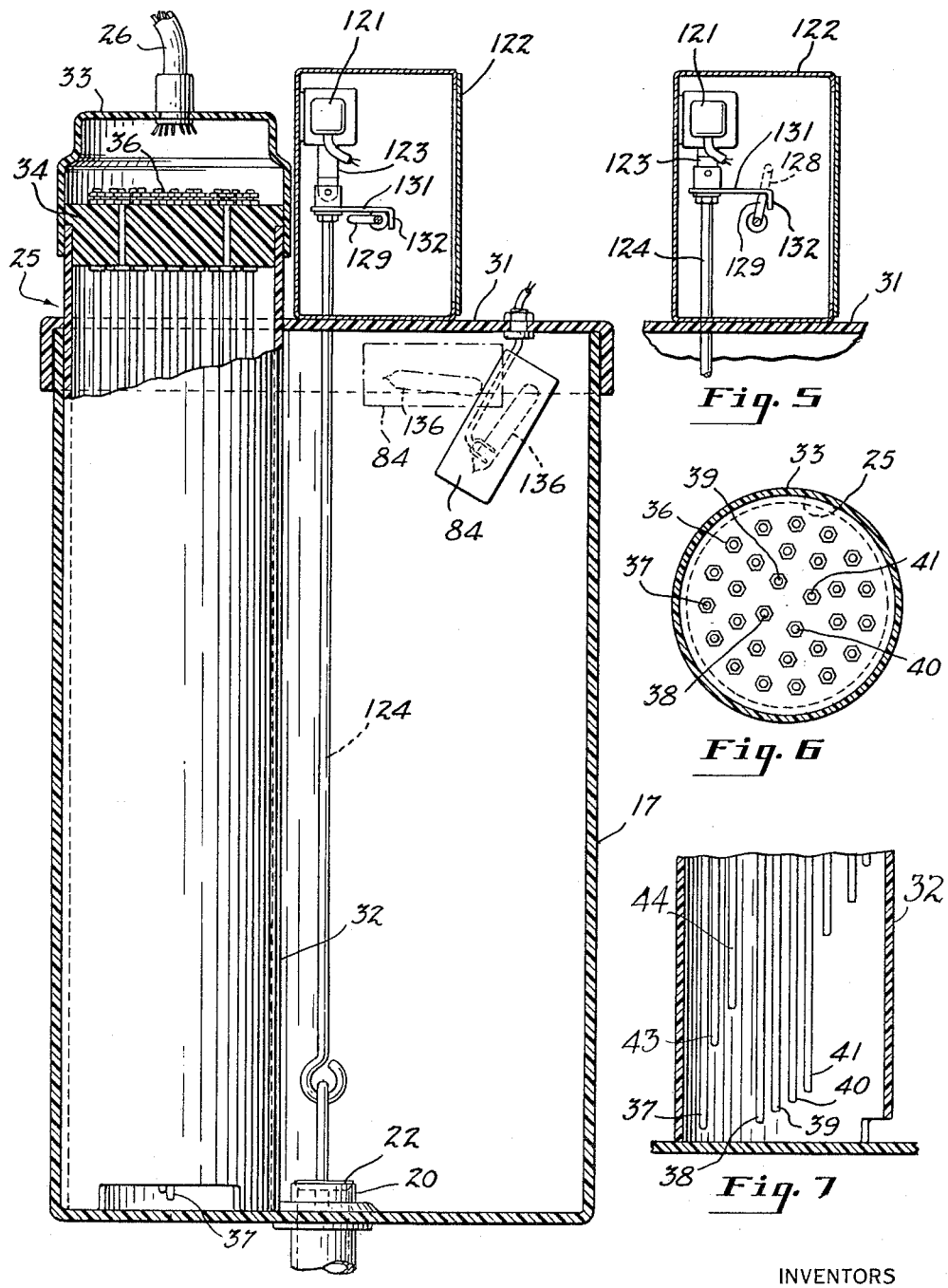

May 21, 1963 F. R. HINDS ETAL 3,090,525
METERING SYSTEM FOR ELECTRICALLY CONDUCTIVE FLOWABLE MATERIALS
Filed Jan. 6, 1961 4 Sheets-Sheet 3
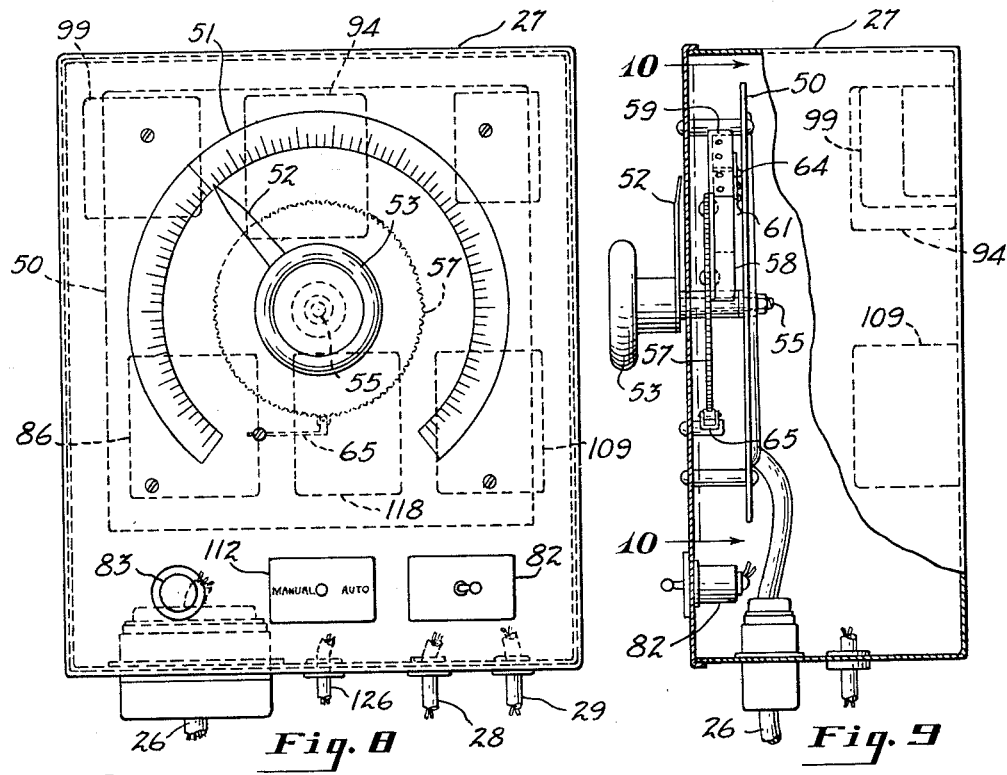
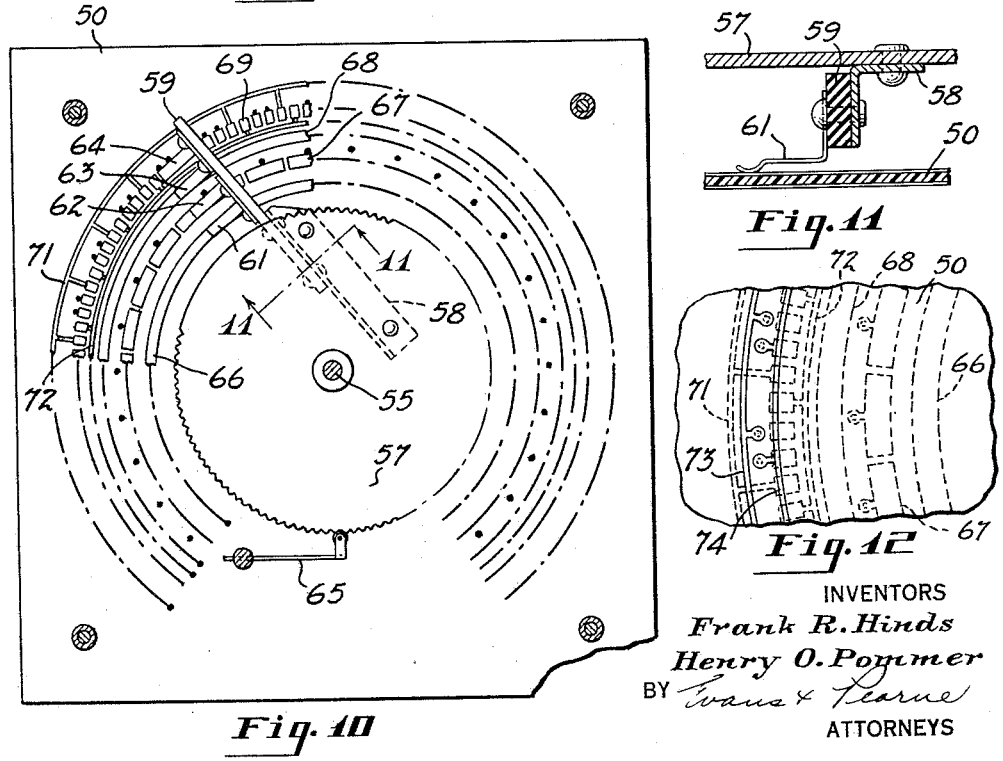
INVENTORS
Frank R. Hinds
Henry O. Pommer
BY Evans & Pearne
ATTORNEYS

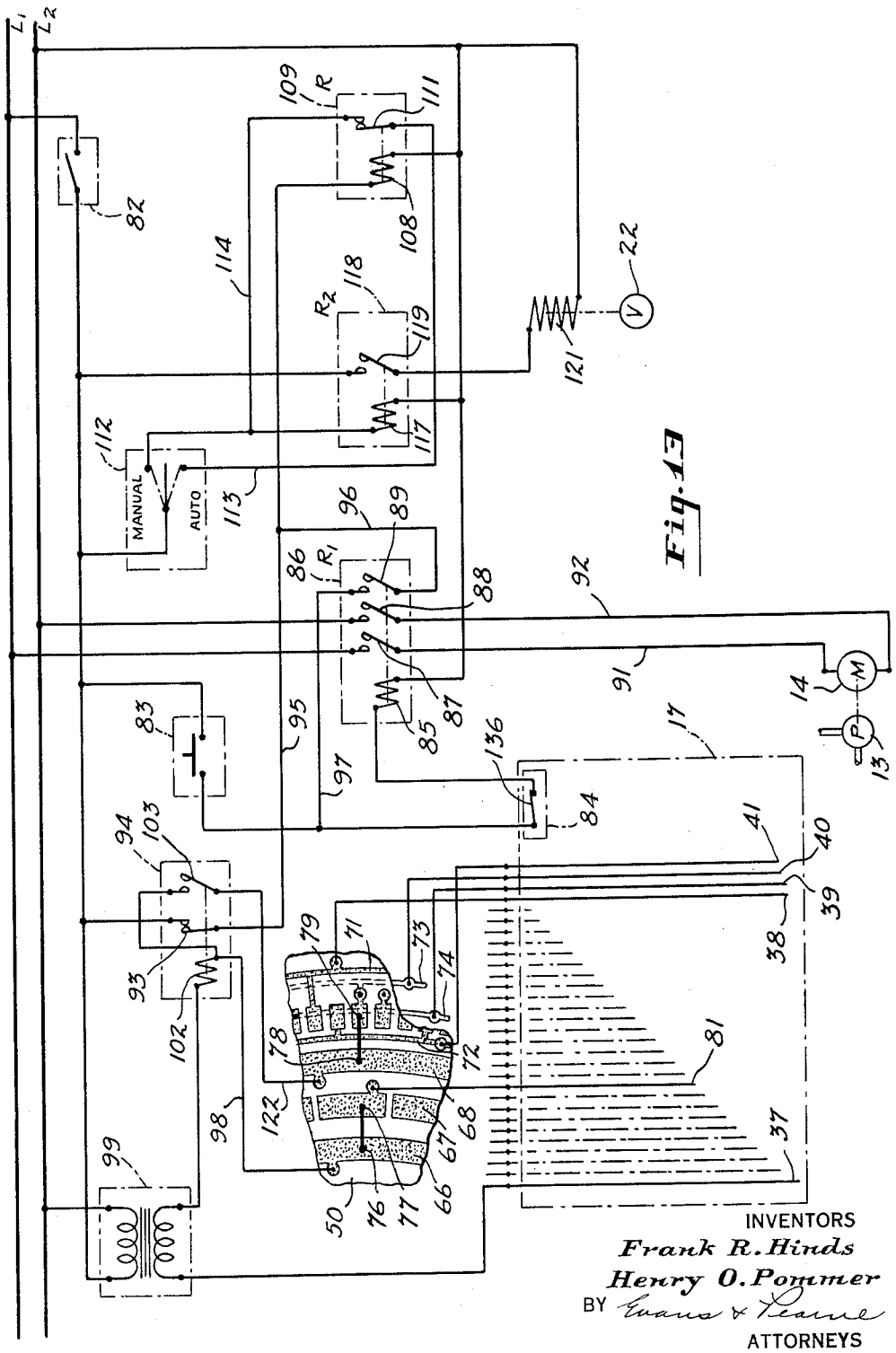

United States Patent Office 3,090,525
Patented May 21, 1963

3,090,525
METERING SYSTEM FOR ELECTRICALLY CONDUCTIVE FLOWABLE MATERIALS
Frank R. Hinds, Shaker Heights, and Henry O. Pommer, Euclid, Ohio, assignors, by mesne assignments, to Martin-Marietta Corporation, Chicago, Ill., a corporation of Maryland
Filed Jan. 6, 1961, Ser. No. 81,007
6 Claims. (Cl. 222—64)

This invention relates to a new and improved metering system for electrically conductive flowable materials such as liquids. More particularly, the invention relates to a metering system which permits a high degree of selectivity in the quantities metered.

Although metering systems have heretofore been developed to permit the automatic or semi-automatic metering of predetermined quantities of materials, one of the problems in such systems has been the complexity of the controls necessary to achieve sufficient selectivity in the quantities of material metered. This problem is of particular significance when the system is to be operated automatically. Generally, automatic operation of metering systems for liquids and the like involves the positioning of electrically conductive sensing elements within a measuring container, for example, so that when the level of material in the container rises certain electrical circuits will be rendered operative to suspend the flow of additional material into the container and cause discharge of the material from the container.

It will be apparent that when a high degree of selectivity in the quantities of material to be metered is essential, the number of sensing elements required increases enormously thereby increasing the cost and, in many cases, the size of the equipment necessary to accomplish the desired results.

The metering system of the present invention overcomes many of the difficulties encountered in systems employed heretofore. The system of the invention provides a high degree of selectivity in the quantities of material metered while greatly reducing the number of sensing elements required to achieve automatic or partially automatic operation of the system. Because of the great reduction in the number of sensing elements required, the system of the present invention may be produced at a substantially lower cost than systems heretofore employed, and the size of the equipment may be reduced considerably without sacrificing the accuracy of the metering.

Other advantages of the invention will be apparent from the following description and drawings in which:

FIGURE 4 is an enlarged view taken along line 4—4 of FIGURE 2.

FIGURE 5 is a view of the valve control shown in FIGURE 4 with the control in a raised position.

FIGURE 6 is a sectional plan view of the probe assembly taken along line 6—6 of FIGURE 2.

FIGURE 7 is a fragmentary view partially in section of the bottom portion of the probe assembly.

FIGURE 8 is an enlarged front elevation of the control box shown in FIGURE 1.

FIGURE 9 is a side elevation partially in section of the control box shown in FIGURE 8.

FIGURE 10 is a view taken along line 10—10 of FIGURE 9 showing a portion of the electrical circuitry.

FIGURE 11 is a greatly enlarged view along line 11—11 of FIGURE 10 showing a portion of the electrical contact arm.

FIGURE 12 is a fragmentary view showing part of the reverse side of the electrical circuit plate shown in FIGURE 10.

FIGURE 13 is a diagram of the electrical circuit of the metering system.

Figure 3:
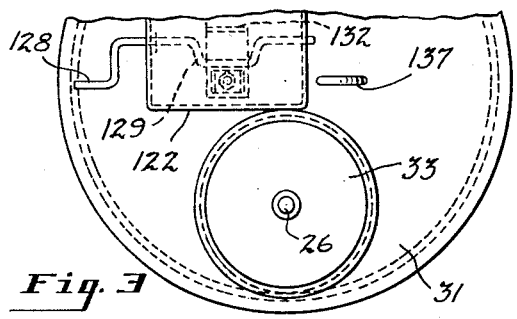
FIGURE 3 is an enlarged fragmentary view taken along line 3—3 of FIGURE 1.

A metering system for electrically conductive flowable liquids and the like as shown in the drawings comprises a storage tank 11 from which a liquid may be withdrawn through pipe 12 into pump 13 driven by an electric motor 14 and forced through pipe 15 into a measuring tank or container 17. Tank 17 has an inlet opening 19 and an outlet opening 20 in which are positioned movable valves 21 and 22, respectively. When the desired quantity of liquid is accumulated in tank 17, the motor 14 is shut off stopping the flow of liquid into the tank 17 through pipe 15. At any desired time, the liquid may be discharged through discharge pipe 24 by raising valve 22.

To permit automatic operation of the metering system, a probe assembly 25 having a housing 32 and a cover 33 is positioned within tank 17 and is connected through cable 26 to appropriate control devices located within box 27. The control box 27 is connected to a suitable source of electric current by a cable 28. The motor 14 is connected to the control box 27 by a cable 29.

The probe assembly housing 32 rests on the bottom of the container and extends upwardly through cover 31 of the container. As shown in FIGURE 4, a supporting disc or plate 34 is positioned within the upper part of the housing 32 and has secured thereto, preferably threadedly, a number of electrically conductive sensing elements which extend down toward the bottom of the tank 17. The upper part of each sensing element extends through the plate 34 and has attached thereto an electrical lead wire with a suitable nut 36. The other end of the lead is connected to appropriate controls located within the control box 27.

As shown in FIGURE 7, the sensing elements or rods are positioned within the probe assembly 25 so that the bottom end of each rod is a different predetermined distance from the bottom of the tank 17. Advantageously, the rods are arranged in a spiral or concentric circles so that a large number of sensing elements may be accommodated in a relatively small area.

The tip of rod 37 extending closest to the bottom of the tank 17 in normal operation is maintained below the surface of the liquid in the tank and serves as a ground. The rods 38, 39, 40 and 41 are spaced progressively further from the bottom of the tank and constitute minimum level sensing elements while the remaining rods are spaced still further from the bottom and constitute maximum level sensing elements. The vertical spacing between each of the minimum level sensing rods 38—41 is considerably less than the vertical spacing between the highest minimum sensing level rod 41 and the lowest maximum level sensing rod 43 and also between each of the maximum level sensing rods. As shown in the drawings the spacing between each of the minimum level sensing rods 38—41 is about one-fourth the spacing between the maximum level sensing rods. Thus, if the portion of the tank between each of the minimum level sensing rods contains one unit volume of liquid, e.g., one quart, the portion between each of the maximum level sensing rods contains four unit volumes or four quarts. By selecting the appropriate maximum and minimum levels, it is possible to meter quantities of liquid differing by unit volume increments of one quart, for example, while substantially all of the sensing elements in the tank are spaced four unit volumes apart.

With the above construction, it is possible to meter four quarts of liquid by filling the tank 17 until the liquid level contacts the lowest maximum sensing element 43 and then to discharge sufficient liquid so that the level in the tank falls just below the tip of rod 41. If five quarts are to be metered, the same amount of liquid would be pumped into the tank, that is, until the level reached the end of rod 43, but liquid would be discharged from the tank until the level fell below rod 40 instead of rod 41, thus metering an extra quart of liquid from the tank in addition to the four quarts or a total of five quarts. In the same way, six or seven quarts of liquid could be metered from the tank by filling to the same level as before but dropping the level just below the tip of rod 39 or rod 38, respectively. If eight to eleven quarts are desired, the next maximum level sensing element 44 would be employed in combination with the appropriate minimum element 38—41. With each increase of four quarts, the next higher maximum level element would be used.

By the employment of appropriate switch operators (described hereinafter) it is possible to preselect the quantity of liquid to be metered from the tank and thereafter add and remove liquid from the tank automatically. For example, when the liquid level in the tank reaches the preselected maximum level sensing rod, the electrical circuit formed between the rod 37 and the selected maximum rod contacted by the liquid, will actuate switches to shut off the motor and thus stop the flow of additional liquid into the tank. Also, the outlet opening of the tank may be opened by suitable switch operators to automatically discharge liquid from the tank. When the desired quantity of liquid has been metered and the liquid level falls below the preselected minimum level sensing rod, the breaking of the circuit between the rod 37 and the selected minimum rod will actuate switches to automatically close the outlet opening.

As shown in the drawings, by appropriate circuitry, the maximum and minimum levels desired may be preselected with a single setting. The sensing elements in probe assembly 25 are connected by suitable electrical lead wires to a circuit plate 50 mounted within control box 27 and directly behind a calibrated dial 51 affixed to the front of the box. In the center of the dial is a pointer 52 which may be angularly moved by knob 53. Extending into box 27 from knob 53 is a shaft 55 which turns when the pointer and knob are moved. Attached to shaft 55 behind the dial 51, but in front of the circuit plate 50, is a disc 57 on which is mounted a contact arm assembly consisting of a block 58 and a contact arm 59 carried thereby. To the contact arm are secured four sliding contact members 61, 62, 63, and 64 which bear against circuit plate 50. Disc 57 has a serrated periphery which contacts a spring-pressed pawl 65 thereby preventing inadvertent rotation of the disc and contact members but permitting positive actuation in either direction.

The circuit patterns on plate 50 are preferably arranged in concentric circles, four such circles being shown in the drawings. Patterns 66 and 68 are continuous conductive strips while patterns 67 and 69 are divided into a series of interrupted contact sections. Each contact section of pattern 67 is connected to one of the maximum level sensing elements of the probe assembly 25. These contact sections are electrically connected with the sensing elements in a manner so that as the pointer advances in a clockwise direction, the particular sensing element connected to the contact section will be a greater distance from the bottom of the tank 17.

The outer circuit pattern 69 is divided into small contact sections each of which is approximately one-fourth the size of the contact sections in pattern 67. Conductive path 71 connects to every fourth section along pattern 69 and to one of the minimum level sensing elements. Likewise, each of the conductive paths 72, 73, and 74 similarly connect with every fourth section of the remaining contact sections and to one of the other minimum sensing elements. In this way, each of the contact sections of pattern 69 is connected to one of the four minimum level sensing elements 38—41.

When knob 53 is rotated slightly contact members 61—64 slide along the circuit patterns on plate 50, with contact member 62 remaining on one section of pattern 67 while contact member 64 slides across four sections of pattern 69. In this way, the maximum level in the tank for a particular setting will remain the same while the minimum level will be changed so as to provide an increase in the quantity metered as the pointer 52 is advanced along dial 51.

An example of the automatic operation of the above metering system will be described in greater detail with reference to FIGURE 13. In this figure, points 76, 77, 78, and 79 on the circuit plate 50 represent the positions of contact members 61, 62, 63, and 64, respectively. The contact members themselves are not shown in this figure. Rod 81 is connected to contact point 77 and rod 40 is connected to contact point 79 through conductive path 73.

Thus, when switch 82 is closed and push button 83 is depressed, current will flow through float switch 84 energizing solenoid 85 in relay 86. The energizing of solenoid 85 closes the contacts 87, 88, and 89 in relay 86 permitting current to flow through leads 91 and 92 to start motor 14 thereby rotating pump 13 and pumping liquid into tank 17. The contacts 87, 88, and 89 are maintained in a closed position by continuing the flow of current to solenoid 85. This is accomplished by maintaining a flow of current through normally closed contact 93 in relay 94, leads 95 and 96, contact 89 and lead 97. As the quantity of liquid pumped into tank 17 by pump 13 increases, the level of liquid will rise until it touches the end of rod 81. This will complete a circuit through transformer 99, ground 37, the liquid in tank 17, rod 81, contact points 77 and 76 and lead 98 to relay 94. Relay 94 has a contact 93, a solenoid 102 and a second contact 103. Completing the circuit energizes solenoid 102 which opens contact 93 and closes contact 103.

The opening of contact 93 in relay 94 breaks the circuit through leads 95, 96, and 97 thereby de-energizing solenoid 85 and opening contacts 87, 88, and 89 which shuts off motor 14 stopping the pump 13. The opening of contact 93 also stops the flow of current through line 95 which de-energizes solenoid 108 in relay 109 closing contact 111.

If discharge switch 112 has been set in its automatic position during the pumping operation, the closing of contact 111 will permit the flow of current through lead 113, contact 111 and lead 114 to energize solenoid 117 in relay 118. This closes the normally open contact 119 in relay 118 permitting the flow of current to energize solenoid 121 which raises valve 22 and starts a discharge of liquid from tank 17.

As the liquid is being discharged from tank 17, the liquid level drops below the end of rod 40. The circuit through rod 40, conductive path 73, contact points 79 and 78, lead 122 and contact 103 in relay 94 is thus interrupted which de-energizes solenoid 102 and closes contact 93. The closing of contact 93 completes the circuit through lead 95 and energizes solenoid 108 in relay 109 opening contact 111. This interrupts the circuit through lead 114 and solenoid 117 de-energizing the solenoid which permits contact 119 in relay 118 to open. Opening contact 119 deenergizes solenoid 121 and permits valve 22 to move into its closed position thereby shutting off the flow of liquid from tank 17 at the selected minimum level.

Figure 2:
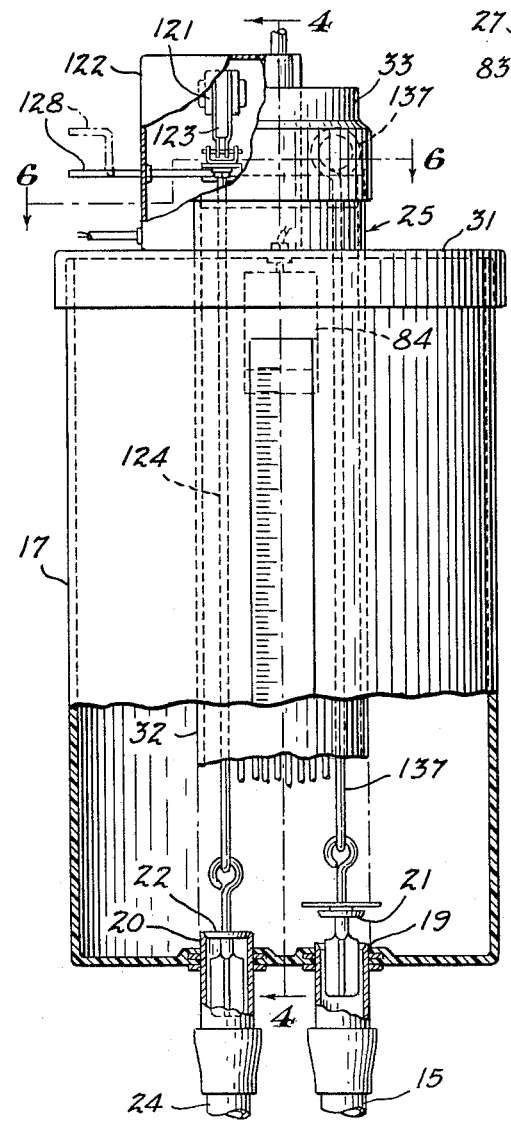
FIGURE 2 is an enlarged front elevation partially in section of the measuring tank shown in FIGURE 1 with parts broken away.
Figure 1:
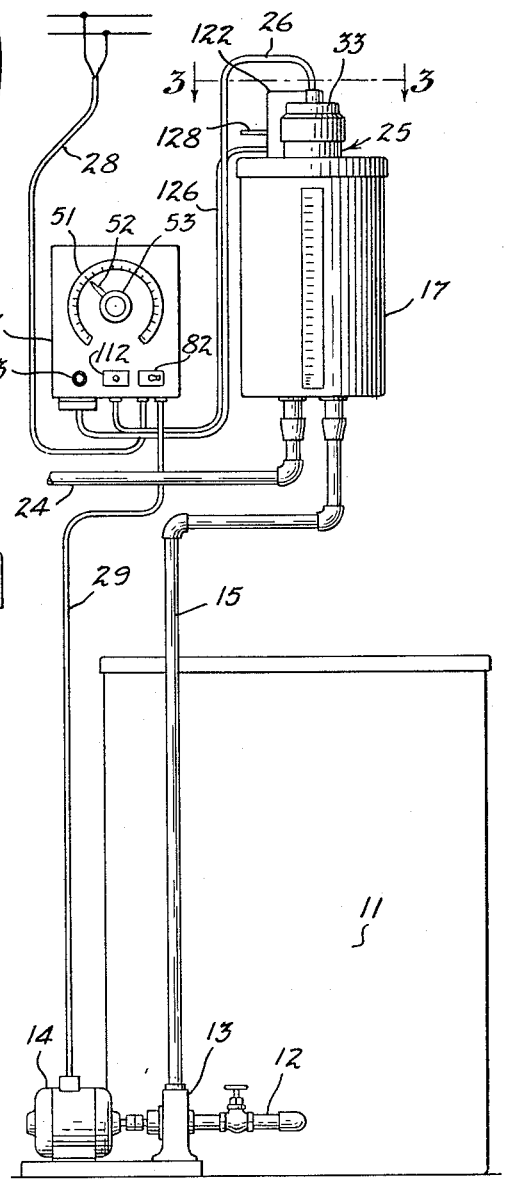
FIGURE 1 is a diagrammatic elevation showing a metering system of the invention.

Automatic operation of the valve 22 may be accomplished by the apparatus shown in FIGURES 2–5. The energizing of solenoid 121 located in box 122 raises link 123 and the rod attached thereto 124. Rod 124 in turn is attached to discharge valve 22 so that raising link 123 raises discharge valve 22 and permits the liquid accumulated in the tank to flow out through outlet opening 20.

Solenoid 121 is electrically connected to control box 27 through cable 126 and discharge switch 112.

The manual discharge of the liquid in tank 17 may be accomplished by moving handle 128 which extends from box 122. Movement of handle 128 causes an offset portion thereof 129, within the box 122, to press against the bottom surface of a horizontal plate 131 secured to the upper portion of rod 124. The pressure of offset portion 129 against the bottom surface of plate 131 raises the plate upwardly thereby causing rod 124 to which the plate is attached and the valve 22 attached to the rod to be raised. Maintaining handle 128 in a position which raises valve 22 the greatest distance is facilitated by a flange 132 which extends downwardly from plate 131 and which acts as a stop against which the offset portion 129 of handle 128 may rest.

To prevent the overflow of liquid from tank 17 in the event of a failure in the maximum level sensing circuit, a float switch 84 is suspended from the cover 31 of the tank. As shown in the drawing, this switch may be a mercury capsule 136 imbedded in a material which will float on the liquid being metered so that if the level of liquid should rise close to the top of the tank, the switch will float on the surface of the liquid and break the circuit thereby stopping the flow of current to motor 14.

If it is desired to return a portion or all of the liquid in tank 17 to storage tank 11, this may be accomplished by raising valve 21 in inlet opening 19. As shown in the drawings, valve 21 may be raised by lifting rod 137 extending from the cover 31 of the tank and attached to valve 21.

While the above description has described in detail one embodiment of the metering system of the present invention, it will be apparent that various modifications may be made to accommodate the system to particular situations or conditions. For example, while the minimum level sensing rods 38—41 as shown in the drawings are spaced about one-fourth the vertical spacing between each of the maximum level sensing rods, the number of the minimum sensing elements may be increased or decreased with the distance between each of them being proportionally changed. Also, if desired, the pre-selection of a particular maximum level sensing element and a particular minimum level sensing element may be accomplished with separate controls rather than with a single setting of a dial as described above. In addition, the type and arrangement of the sensing elements may be modified without changing the manner in which the elements control the liquid levels in the tank.

Although the invention has been described for the metering of liquids, the form of liquid is not critical provided that the liquid is flowable and is electrically conductive. Examples of flowable materials which may be successfully metered with the system of the present invention include solutions, suspensions, emulsions and other liquid mixtures, and solid materials, e.g., powders or granules which flow in a manner similar to liquids.

It will be apparent from the above description that the metering system of the invention overcomes many of the difficulties encountered in systems heretofore employed. The metering system of the present invention provides a high degree of selectivity in the quantities of material metered while at the same time permitting simplification of the apparatus required to achieve automatic or partially automatic metering. This simplification is achieved in accordance with the invention while greatly reducing the number of sensing elements normally required under these conditions. As a result, the metering system of the invention may be produced at a substantially lower cost than the systems heretofore employed for the metering of electrically conductive flowable materials. In addition, the size of the apparatus required to accomplish the metering may be reduced considerably, and a further advantage of the metering system of the invention is that all of the above benefits may be achieved without sacrificing any of the accuracy of metering.

Since, as pointed out above, various modifications of the metering system may be made within the scope of the invention, the invention is not intended to be limited to the specific details of the system disclosed herein except as may be required by the appended claims.

What is claimed is:

1. A metering system for an electrically conductive flowable material which comprises means for conveying said material to a container, a plurality of electrically conductive sensing elements positioned at predetermined distances from the bottom of said container to control the maximum level of said material in said container and a plurality of electrically conductive sensing elements positioned at predetermined distances from the bottom of said container to control the minimum level of said material, the vertical spacing between the ends of said minimum level sensing elements providing volume increments within said container which are fractions of the volume increments between the ends of the maximum level sensing elements, circuit selector means which permit the formation of a circuit through one of said maximum level sensing elements whereby the accumulation of quantities of said material in said container to the level of said selected maximum sensing element will stop the flow of additional quantities of material into said container, means for discharging said accumulated material from said container, and second circuit selector means which permit the formation of a circuit through one of said minimum level sensing elements so that when the level of said material drops below said selected minimum sensing element the discharge of material will cease.

2. A metering system for an electrically conductive flowable material which comprises means for conveying said material to a container of substantially constant cross-sectional area, a plurality of electrically conductive sensing elements positioned at predetermined distances from the bottom of said container to control the maximum level of said material in said container and a plurality of electrically conductive sensing elements positioned at predetermined distances from the bottom of said container to control the minimum level of said material, the ends of said minimum level sensing elements being spaced vertically from each other a fraction of the vertical spacing between each of the maximum level sensing elements, circuit selector means which permit the formation of a circuit through one of said maximum level sensing elements whereby the accumulation of quantities of said material in said container to the level of said selected maximum sensing element will stop the flow of additional quantities of material into said container, means for discharging said accumulated material from said container, and second circuit selector means which permit the formation of a circuit through one of said minimum level sensing elements so that when the level of said material drops below said selected minimum sensing element the discharge of material will cease.

3. A metering system for an electrically conductive flowable material which comprises means for conveying said material to a container of substantially constant cross-sectional area, a plurality of electrically conductive sensing elements positioned at predetermined distances from the bottom of said container to control the maximum level of said material in said container and a plurality of electrically conductive sensing elements positioned at predetermined distances from the bottom of said container to control the minimum level of said material, the ends of said minimum level sensing elements being spaced vertically from each other a fraction of the vertical spacing between each of the maximum level sensing elements, circuit selector means which permit the formation of circuits through one of said maximum level sensing elements and one of said minimum level sensing elements whereby the accumulation of quantities of said material in said container to the level of said selected maximum sensing element will stop the flow of additional quantities of material into said container and start the discharge of said accumulated material from said container and whereby the discharge of material will cease when the level of said material drops below said selected minimum sensing element.

4. A metering system for electrically conductive liquids which comprises means for conveying said liquid to a calibrated container, a plurality of electrically conductive sensing elements positioned at predetermined distances from the bottom of said container to control the maximum liquid level in said container and a plurality of electrically conductive sensing elements positioned at predetermined distances from the bottom of said container to control the minimum liquid level, the vertical spacing between the ends of said minimum level sensing elements providing volume increments within said container which are fractions of the volume increments between the ends of the maximum level sensing elements, circuit selector means which permit the formation of a circuit through one of said maximum level sensing elements whereby the accumulation of quantities of liquid in said container to the level of said selected maximum sensing element will complete an electrical circuit through said liquid to stop the means conveying said liquid and thereby prevent the flow of additional liquid into said container, means for discharging the liquid accumulated in said container therefrom, and second circuit selector means which will maintain an electrical circuit through one of said minimum level sensing elements and said liquid until the level thereof drops below said selected minimum sensing element whereby the circuit will be interrupted and stop the discharge of liquid from said container.

5. A metering system for electrically conductive liquids which comprises means for conveying said liquid to a container of substantially constant cross-sectional area, a plurality of electrically conductive sensing elements suspended within said container at predetermined distances from the bottom thereof to control the maximum liquid level in said container and a plurality of electrically conductive sensing elements suspended within said container at predetermined distances from the bottom thereof to control the minimum liquid level, the ends of said minimum level sensing elements being spaced vertically from each other a fraction of the vertical spacing between each of the maximum level sensing elements, circuit selector means which permit the formation of a circuit through one of said maximum level sensing elements whereby the accumulation of quantities of liquid in said container to the level of said selected maximum sensing element will complete an electrical circuit through said liquid to stop the flow of additional liquid into said container, means for discharging the liquid accumulated in said container therefrom, and second circuit selector means which will maintain an electrical circuit through one of said minimum level sensing elements and said liquid until the level thereof drops below said selected minimum sensing element whereby the circuit will be interrupted and stop the discharge of liquid from said container.

6. A metering system for electrically conductive liquids which comprises means for conveying said liquid to a container of substantially constant cross-sectional area, a plurality of electrically conductive sensing elements suspended within said container at predetermined distances from the bottom thereof to control the maximum liquid level in said container and a plurality of electrically conductive sensing elements suspended within said container at predetermined distances from the bottom thereof to control the minimum liquid level, the ends of said minimum level sensing elements being spaced vertically from each other a fraction of the vertical spacing between each of the maximum level sensing elements, circuit selector means which permit the formation of circuits through one of said maximum level sensing elements and one of said minimum level sensing elements whereby an electrical circuit will be completed by the accumulation of quantities of liquid in said container to the level of said selected maximum sensing element to stop the flow of additional liquid into said container and start the discharge of the liquid accumulated therein, and whereby a second electrical circuit will be interrupted when the level of said liquid drops below said selected minimum sensing element and stop the discharge of liquid from said container.

References Cited in the file of this patent
UNITED STATES PATENTS

| 2,261,495 | Ewertz | Nov. 4, 1941 |
| 2,957,606 | Tarukawa | Oct. 25, 1960 |